(12) United States Patent
Chow

(10) Patent No.: US 8,644,335 B2
(45) Date of Patent: Feb. 4, 2014

(54) ACCESS NODE FOR A COMMUNICATIONS NETWORK

(75) Inventor: Hungkei K. Chow, Livingston, NJ (US)

(73) Assignee: Alcatel Lucent, Paris (FR)

( * ) Notice: Subject to any disclaimer, the term of this patent is extended or adjusted under 35 U.S.C. 154(b) by 146 days.

(21) Appl. No.: 13/248,686

(22) Filed: Sep. 29, 2011

(65) Prior Publication Data

US 2013/0083673 A1 Apr. 4, 2013

(51) Int. Cl.
*H04J 3/16* (2006.01)
*H04J 3/04* (2006.01)

(52) U.S. Cl.
USPC ............................ 370/465; 370/534; 370/535

(58) Field of Classification Search
None
See application file for complete search history.

(56) References Cited

U.S. PATENT DOCUMENTS

| | | | |
|---|---|---|---|
| 2002/0176431 A1* | 11/2002 | Golla et al. | 370/412 |
| 2003/0002505 A1* | 1/2003 | Hoch et al. | 370/392 |
| 2003/0028642 A1* | 2/2003 | Agarwal et al. | 709/226 |
| 2003/0202516 A1* | 10/2003 | Shanley et al. | 370/395.4 |
| 2005/0141424 A1* | 6/2005 | Lim et al. | 370/235 |
| 2006/0140191 A1* | 6/2006 | Naik | 370/395.4 |
| 2008/0107020 A1* | 5/2008 | Trinh et al. | 370/229 |
| 2008/0198748 A1* | 8/2008 | Gilfix et al. | 370/235 |
| 2008/0212472 A1* | 9/2008 | Musacchio et al. | 370/232 |
| 2008/0232361 A1* | 9/2008 | Kimiyama et al. | 370/389 |
| 2009/0060530 A1 | 3/2009 | Biegert et al. | |
| 2009/0259862 A1* | 10/2009 | Bulusu et al. | 713/322 |
| 2009/0265569 A1* | 10/2009 | Yonezawa et al. | 713/324 |
| 2010/0111523 A1 | 5/2010 | Hirth et al. | |

FOREIGN PATENT DOCUMENTS

| | | |
|---|---|---|
| WO | 2010000307 A1 | 1/2010 |
| WO | PCT/US2012/053857 | 1/2013 |

* cited by examiner

*Primary Examiner* — Andrew Lee
(74) *Attorney, Agent, or Firm* — S. Wyse

(57) ABSTRACT

An access node such as an OLT or DSLAM for use in a communications network. The access node performs a plurality of functions using in a number of function modules, each divided into one or more sub-modules. The status of the sub-modules is controlled by a controlled by a controller that reviews load statistics and other inputs and determines whether the configuration of the function module should be changed. If so, individual sub-modules are powered down, clock-gated, or returned to operational status. A traffic dispatcher positioned before each function module distributes the data traffic to available sub-modules for processing, after which it is aggregated by a traffic aggregator and passed on to the next stage. A number of circuit boards may be used, each containing only one or two function modules. The boards are connected by short, high-speed serial lines, which may have multiple links whose status may also be controlled.

22 Claims, 13 Drawing Sheets

ACCESS NODE FOR A COMMUNICATIONS NETWORK

TECHNICAL FIELD

The present invention relates generally to the field of communication networks, and, more particularly, to an access node positioned between the core and subscriber portions of the network and an efficient method of handling data traffic passing through the access node.

BACKGROUND

The following abbreviations are herewith defined, at least some of which are referred to within the following description of the state-of-the-art and the present invention.
DBA dynamic bandwidth allocation
DSL digital subscriber line
DSLAM DSL access multiplexer
FEC forward error correction
GE gigabit ethernet
GEM GPON encapsulation method
GPON gigabit PON
LT line termination
MAC media access control
NR-DBA non-status-reporting DBA
NT network termination
OLT optical line terminal
PCS physical coding sublayer
PMA physical medium attachment
PMD physical medium-dependent
PON passive optical network
PP packet processing
ROSA receive optical sub-assembly
SFP small form-factor pluggable
SR-DBA status-reporting DBA
TOSA transmit optical subassembly An access node is positioned between two portions of the communications network, typically the access network and the core network. The access node is, for example, a DSLAM or an OLT. An exemplary communications network having an access node is shown in FIG. 1. FIG. 1 is a simplified schematic diagram illustrating selected components PON (passive optical network) 100 in which an access node according to the present invention may be deployed. The access node in this case is OLT 101, which handles communications between a core network (not shown) and individual subscribers. Trunk lines 105 and 110 are high capacity lines for communications between the OLT 101 and the network core. Subscriber lines 116 through 119 carry communications to and from individual subscribers. As an example, access network line 118 extends between OLT 101 and splitter 120.

In this example, splitter 120 divides the downstream optical signal's constituent wavelengths for transmission to subscriber premises. Subscriber line 118 communicates through premises lines 121 through 126 are shown extending between splitter 120 and ONTs 130 through 135. Note that any upstream traffic from subscribers is not split in this fashion, but instead occurs according to a predetermined schedule where each subscriber is assigned specific time slots. Note that PON 100 is exemplary and network configurations may vary. There are a number of PON design evolutions including BPON, GPON, and XGPON.

FIG. 2 is a simplified block diagram illustrating selected components of an OLT 150 according to the existing art. The OLT 150 of FIG. 2 includes an NT (network termination) side and an LT (line termination) side interconnected by switch fabric 180. Note that that switch fabric 180 is represented only generally. On the NT side, boards 155 and 165 process upstream and down stream traffic between the switch fabric 180 and, respectively, trunk lines 150 and 160. Boards 155 and 165 are typically fabricated as a single unit that may be installed and removed from OLT 150. Each NT card 155, 160 includes a number of functions that represent operations that data traffic undergoes as it passes though the board in either the upstream or downstream direction. Note that these functions represented by abbreviations in FIG. 2 are known in the art and will not be explained in detail here. Note also that there may more or fewer NT boards than is represented in FIG. 2.

Similarly, LT boards 175a through 175n are shown in FIG. 2. LT boards 175a through 175n link subscriber lines 170a through 170n, respectively, with switch fabric 180. Although only four LT boards are shown in FIG. 2, the number of LT boards present is usually significantly higher. In some cases, each board may include multiple ports to accommodate subscriber lines although this is not depicted in the figure. As with the NT boards, each of the LT boards 175a through 175n include a number of traffic-handling functions analogous to those on the NT boards for handling the data traffic as it passes through the LT board in an upstream or downstream direction.

Unfortunately, access nodes designed and operated in this way have some disadvantages, especially an inefficient use of power. Boards having a variety of functions often require many different voltages and are kept fully powered, even though the nature of some transmission is bursty rather than steady. Most boards are run at a high clock speed regardless of traffic.

Accordingly, there has been and still is a need to address the aforementioned shortcomings and other shortcomings associated with access nodes in communication networks. These needs and other needs are satisfied by the present invention.

SUMMARY

The present invention is directed to the configuration and operation of an access node for a telecommunication network. In one aspect, the present invention is an access node for performing a plurality of functions related to handling data traffic between two portions of the communications network including a first interface configured for receiving traffic from the first portion of the network, a plurality of function modules, each function module configured for executing a function of the plurality of functions wherein at least one function module is divided into a plurality of sub-modules each capable of performing the function of the at least one function module, at least one traffic dispatcher, wherein the at least one traffic dispatcher is positioned between the first interface and the at least one function module, wherein the traffic dispatcher is configured to dispatch the traffic to one or more of the plurality of sub-modules for processing, a controller configured for controlling the status of sub-modules in the plurality of sub-modules, and a second interface configured for forwarding traffic to the second portion of the network. The access node may handle traffic in this fashion in either the upstream or downstream directions or both.

In some embodiments, the controller receives for load statistics representative of the amount of traffic being handled by the access node, for example, as collected by a buffer or plurality of buffers. The load statistics may be used to determine how to control individual ones of the plurality of sub-modules in a function module, though other factors may be used as well, including the use of a pre-determined schedule or manual control by an instruction received from without the access node. The status control of an individual sub-module may include powering it up or down, or applying clock gating or returning it to full operation.

The access node may also include a traffic aggregator configured for aggregating the traffic after processing by the plurality of sub-modules. The traffic aggregator may then pass the data traffic to a transmission channel toward another function module or to a portion of the communications network outside the access node. The transmission channel may be made of a plurality of links. The status of each of the links may be controllable.

Different ones of the plurality of function modules may be formed on separate circuit boards within the access node. A separate controller may be formed on each of the separate circuit boards or a single controller in the access node may control the function modules formed on some or all of the boards. The links between boards are preferably short, high-speed serial links.

In another aspect, the present invention is a method of operating a communications network access node having at least one function module divided into a plurality of sub-modules including receiving data traffic at the access node, distributing the data traffic into one or more of the plurality of sub-modules for processing, and aggregating the data traffic after processing by the plurality of sub-modules.

The method may further include determining whether to change the status of one or more of the plurality of sub-modules, for example, applying clock-gating, powering down a sub-module, or returning a sub-module to full operation. Load statistics indicative of the amount of traffic being handled by the access node may be generated, and, if so, used as the basis or part of the basis for determining whether to change the states of sub-modules.

The method may further include using centralized upstream scheduling, where no grant is issued if a trunk line is expected to be congested. Data packets may then be dropped earlier rather than stored too long in memory only to be dropped later when they cannot be transmitted.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to the configuration and operation of an access node for a telecommunication network. "Access node", as used herein, generally refers to a node situated between the core of the communications network and a subscriber access network. In some cases, it is considered part of one or the other. Examples of access nodes include ONTs in an optical network and DSLAMs enabling DSL service in a telephone network. The access node of the present invention is constructed and operated in such a manner as to facilitate more efficient use, especially where varying traffic levels are encountered. An overview of the access node of the present invention is provided in FIG. 3.

Figure 3:
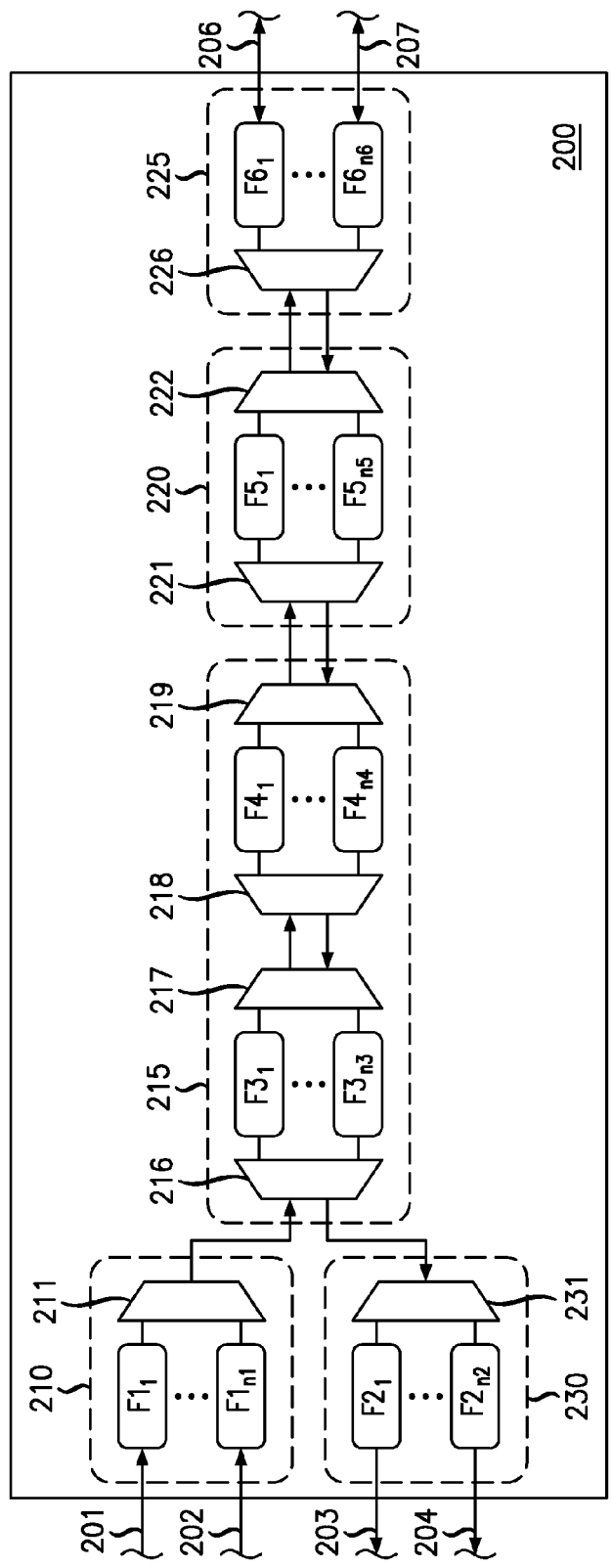
FIG. 3 is a simplified schematic diagram illustrating selected components of an access node according to an embodiment of the present invention.

FIG. 3 is a simplified schematic diagram illustrating selected components of an access node 200 according to an embodiment of the present invention. In this embodiment, subscriber lines 201 through 204 extend from OLT 200 at the left side of the figure and trunk lines 206 and 207 at the right. Here it is noted that while the subscriber lines are represented as either upstream or downstream and the trunk lines 206 and 207 as bidirectional, this is not necessarily the case in all embodiments.

Figure 1:
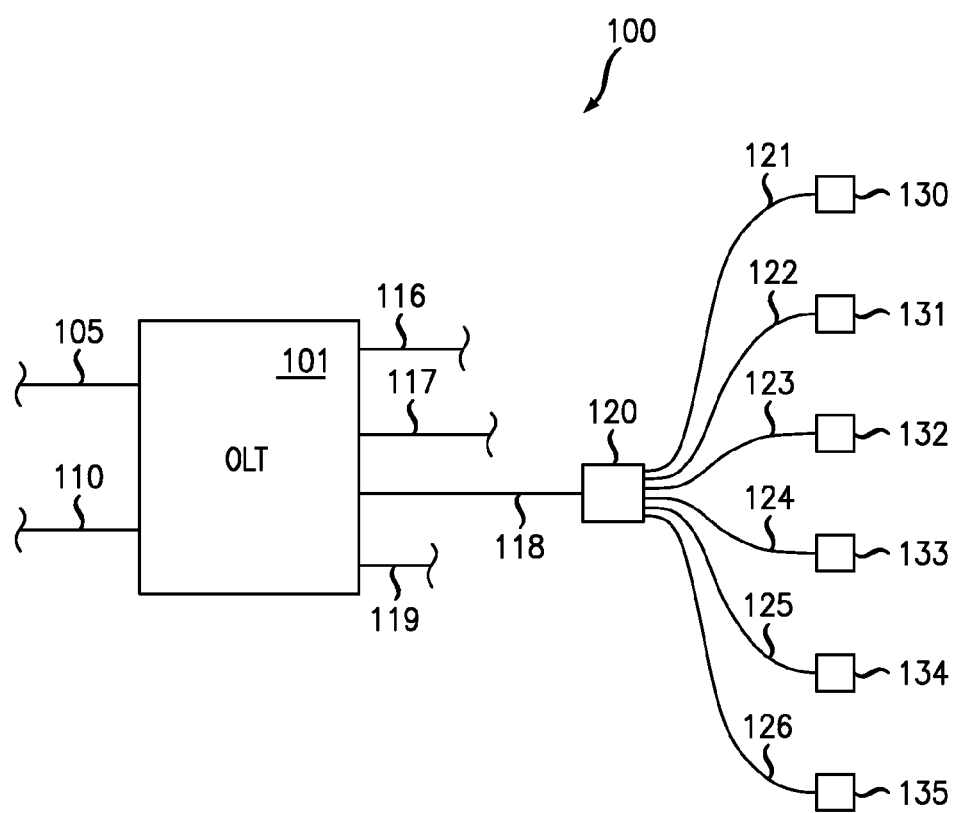
FIG. 1 is a simplified schematic diagram illustrating selected components PON (passive optical network) in which an access node according to the present invention may be deployed.
Figure 2:
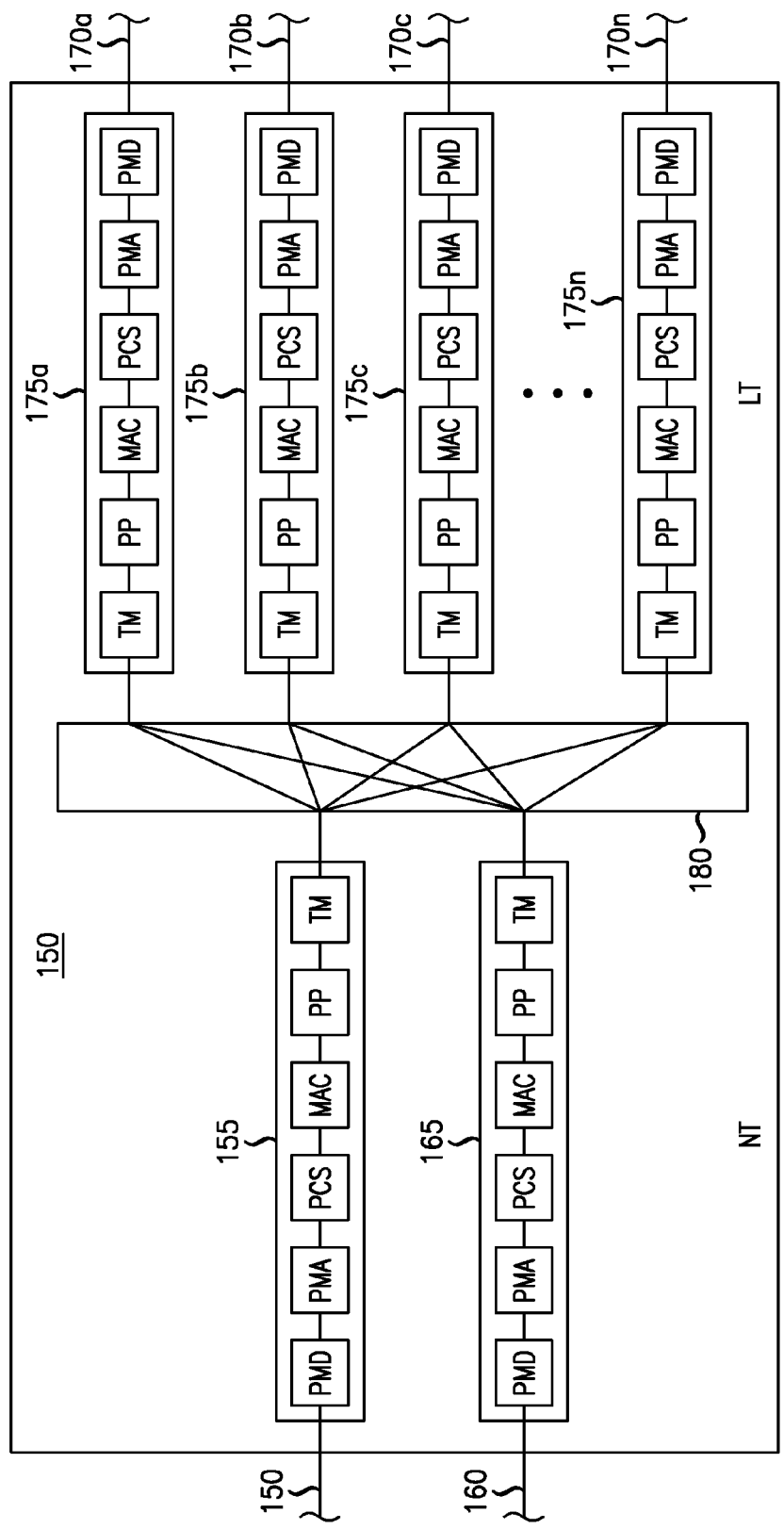
FIG. 2 is a simplified block diagram illustrating selected components of an OLT according to the existing art.

In this embodiment, access node 200 includes function modules F1 through F6, so referred to in the figure. Each of function modules F1 though F6 are divided into one or more sub-modules, and are formed on a circuit board. Note that a function module, as that term is used herein, is implemented in hardware or software executing on a hardware device. A function module performs a discrete task or tasks with respect to the data traffic being handled by the access node. For example, a function module may perform one of the functions of LT board 175a illustrated in FIG. 2. No precise functional definition is required, however, unless specified in a particular embodiment. Each of the sub-modules in a function module performs the same function, but is capable of handling their own stream of data traffic. In that regard, note that while each sub-module performs the same function, there is not a requirement that they are identical in fabrication or operation, although it is expected that will most often be the case.

The separate circuit boards of this embodiment are represented by broken lines in FIG. 3. Using separate boards may reduce the number of different voltages that have to be supplied to components formed on the board, promoting design efficiency and saving power. As shown in FIG. 3 function module F1, which includes sub-modules $F1_1$ through $F1_{n1}$ are formed on board 210 and represent the interface with subscriber lines 201 and 202. Note that the exact number of sub-modules in function module F1 is not specified that that there will often be more subscriber lines than are shown in FIG. 3. Also shown formed on board 210 is a data traffic aggregator 211. The purpose of traffic aggregator 211 is to receive the data traffic from sub-modules $F1_1$ through $F1_{n1}$ and arrange it for sending to the next function module, which in this embodiment is function module F3. As can be seen, function module F3 is formed on a separate board 215. Note that while the traffic flow in from function module F1 to function module F3 is in FIG. 3 represented by a single line, there could actually be a number of parallel channels for communication.

In this embodiment, traffic from aggregator 211 to board 215 is first received at a data traffic dispatcher 216. Dispatcher 216 distributes the data traffic to sub-modules of function module F3, as will be described in further detail below. The sub-modules of function module F3 are referred to as $F3_1$ through $F3_{n3}$. As with function module F1, there could be number of sub-modules in function module F3; note, however, the number of sub-modules will often vary from one function module to the next. In other words, n1 may but does not necessarily equal n3.

In this embodiment, after processing by function module F3, the data traffic proceeds to function module F4, also formed on board 215, as follows. The traffic from the sub-modules of function module F3 pass through traffic aggregator 217, where it is arranged for transmission to traffic dispatcher 218. Upon reception, dispatcher 218 distributes the traffic among the sub-modules $F4_1$ through $F4_{n4}$ for processing.

Note that in an alternate embodiment (not shown), function modules F3 and F4 could be combined into a single function module. In that case there would be no aggregator 217 and dispatcher 218 to somehow separate the two. As will be explained below, however, one of the advantages of the present invention is to, for example, permit function module F3 and function module F4 to use a different number of sub-modules for traffic distribution. Another advantage is gained by the ability to vary the number of sub-modules module operating at a given time according to traffic conditions or other factors. For reason, there will usually be more than one sub-module in a function module, and there will normally be several. By the same token, one or more function modules in the access node may have only a single sub-module, although this is not preferred in most cases.

In the embodiment of FIG. 3, data traffic from function module F4 proceeds to function module F5 on board 220 after first passing though data traffic aggregator 219 and dispatcher 221. Traffic aggregator 219 and dispatcher 221, as with all board-to-board connections, are preferably connected by a number of high capacity serial lines. Function module F5 includes sub-modules $F5_1$ through $F5_{n5}$. After processing by function module F5, the traffic is aggregated by aggregator 222 and forwarding to function module F6 on board 225, being distributing to one or more of sub-modules $F6_1$ through $F6_{n6}$ by dispatcher 226.

In this embodiment, function module F6 interfaces with trunk lines 207 and 207. Again, there could be any number of sub-modules in function module F6 and more trunk lines than are shown in FIG. 3. Note that each of trunk lines 206 and 207 is indicated to be bi-directional, and a downstream path is also shown in through access node 200. For convenience, on the downstream path the relevant components referred to above as aggregators and dispatchers would each represent the other function (which is not explicitly shown in FIG. 3). For example, downstream traffic from function module F6 is aggregated for transmission to board 220, where it is distributed to function module F5, and so forth. This does not imply, however that the function in both directions is performed by exactly the same hardware.

In the embodiment of FIG. 3, however, when downstream traffic leaves function module F3, it is aggregated for transmission to board 230, where dispatcher 231 distributes it to one or more sub-modules $F2_1$ through $F2_{n2}$ for processing and transmission on subscriber lines 203 and 204. Again, there may be any number of sub-modules $F1_1$ through $F2_{n2}$ and more (or fewer) subscriber lines than lines 203 and 204.

Figure 4:
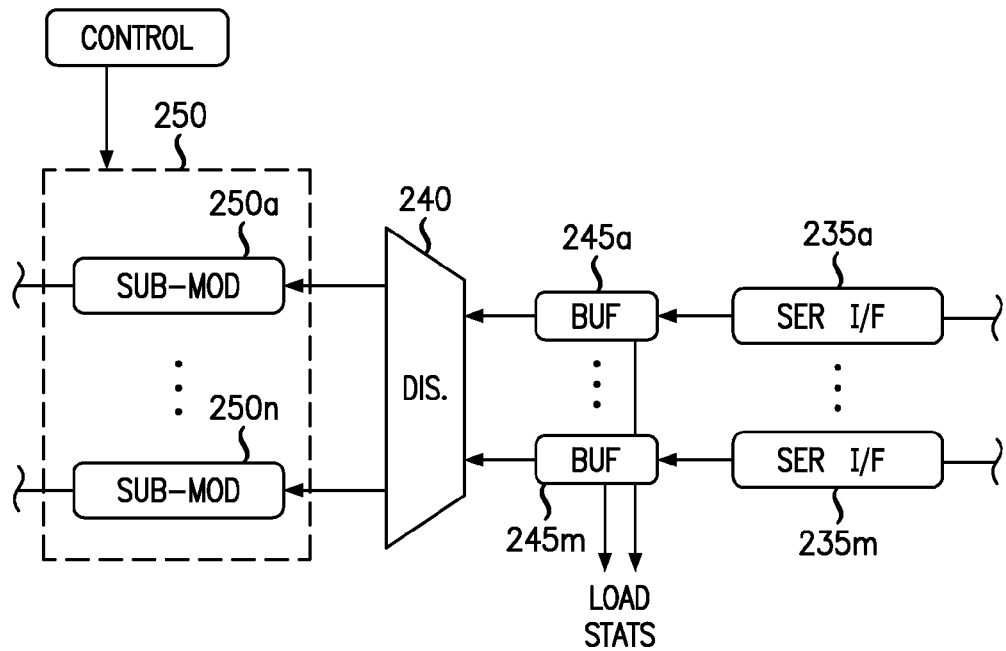
FIG. 4 is a simplified schematic diagram illustrating selected components of an access node, including a traffic dispatcher according to an embodiment of the present invention.

FIG. 4 is a simplified schematic diagram illustrating selected components of an access node, including a traffic dispatcher 240 according to an embodiment of the present invention. As mentioned above, in accordance with the present invention, dispatcher 240 receives data traffic and distributes it to one or more sub-modules of a function module. Here, sub-module 250 includes sub-modules 250a through 250n, representing all of the sub-modules of function module 250, which may contain any number. Here it is noted that the number of sub-modules in a function module may be determined in a variety of ways, but in a preferred embodiment the number of sub-modules is calculated to be able to handle a total design capacity C for the access device based on the maximum rate of traffic that an individual sub-module can process. Other factors may include an adjustment one way or the other for QoS (Quality of Service) considerations or limitations imposed on other function modules.

In the embodiment of FIG. 4, the dispatcher receives the data traffic over a serial transmission channel, often including a number of parallel lines each with a limited capacity but carrying a share of the total traffic as needed. Here, data traffic is received at serial interface 235a through 235m representing all of the lines leading into dispatcher 240. The incoming data traffic is then buffered in a series of buffers 245a through 245m, each corresponding with a serial interface. At buffers 245a through 245m, the incoming traffic load is determined and load statistics are sent to a controller (not shown in FIG. 4). The dispatcher then distributes the traffic from the buffers to one or more of the sub-modules 250a through 250n according to their status and the amount of traffic currently waiting. Note the number of buffers m is not necessarily the same as the number of sub-modules n in the function module.

Finally, in this embodiment there is shown a function module control input. This control input controls the status of each of the sub-modules 250a through 250m and will be explained in more detail below.

Figure 5:
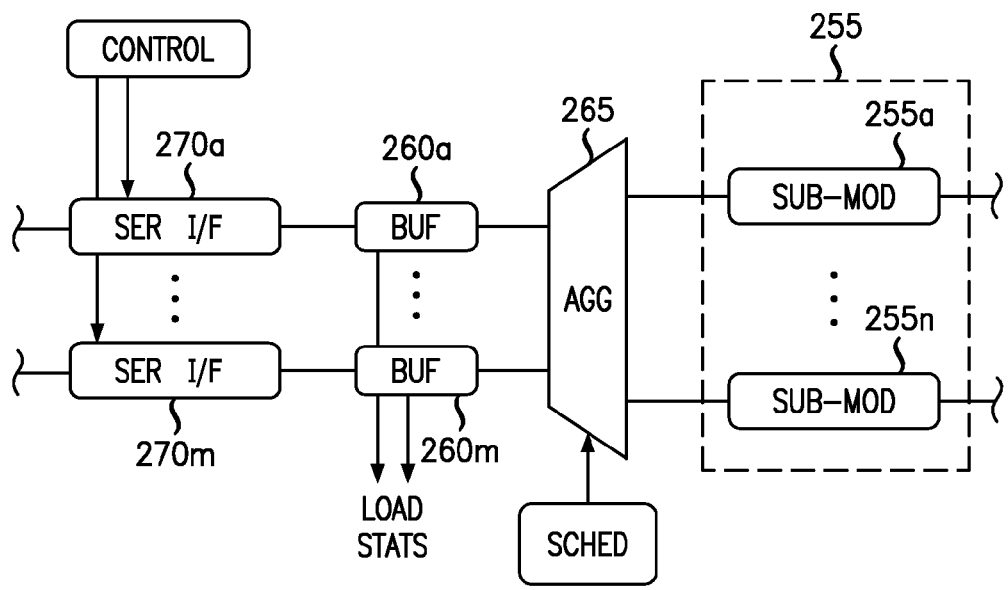
FIG. 5 is a simplified schematic diagram illustrating selected components of an access node, including a traffic aggregator according to an embodiment of the present invention.

FIG. 5 is a simplified schematic diagram illustrating selected components of an access node, including a traffic aggregator 265 according to an embodiment of the present invention. Traffic aggregator 265 receives traffic from sub-modules 255a through 255n of function module 255 and aggregates it as appropriate for transmission to the next stage. Note that traffic aggregator 265 in this embodiment includes a schedule input although this will not be required in every embodiment. The schedule input permits grouping the traffic load for the next stage according to a given schedule.

In this embodiment, traffic to be sent from aggregator 265 is placed in buffers 260a though 260m, each buffer corresponding with the serial interface 270a through 270m of the available transmission channel. Traffic load statistics are gathered from buffers 270a through 270m and sent to a controller (not shown in FIG. 5). There may also, as here, be a control input to the individual serial interfaces for controlling the transmission of traffic to the next stage.

Figure 6:
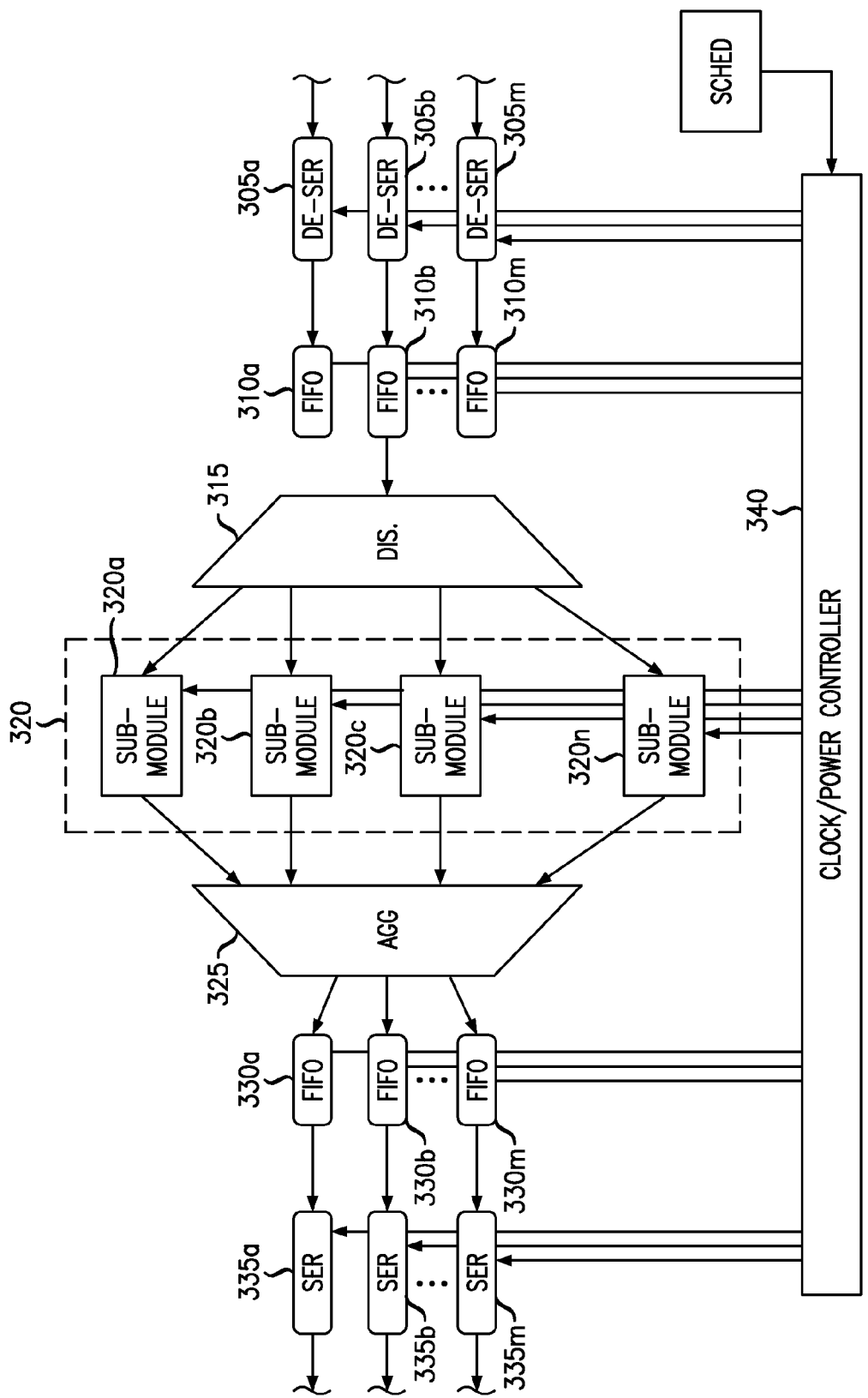
FIG. 6 is a simplified schematic diagram illustrating selected components of an access node according to an embodiment of the present invention.

FIG. 6 is a simplified schematic diagram illustrating selected components of an access node according to an embodiment of the present invention. In FIG. 6, function module 320 includes sub-modules 320a though 320n. Note that each of the sub-modules are arranged to receive control signals from the clock- and power-gating controller 340. In accordance with this embodiment of the present invention, controller 340 may individually change the status of each sub-module by placing it into operating status, applying a clock-gating to use less power, or powering down the sub-module completely. The use of clock-gating permits significant reductions in power consumption while facilitating a more rapid return of the sub-module to full operation.

Preferably, each of the sub-modules is designed to have a capacity of C/n, where C is the total design capacity of the access node and n is the number of sub-modules. But there are times where this throughput is not required due to light traffic loads. So by permitting the controller to adjust the status of each sub-module separately, the system of the present invention seeks the optimum power consumption for the current conditions.

In the embodiment of FIG. 6, data traffic is brought to the function module on a number of serial links and de-serialized at de-serializers 305a through 305m and stored in FIFO buffers 310a through 310m. Note that in accordance with the present invention, at various times not all of the serial links may be active. Each buffer that receives data traffic, however, reports load statistics to the controller. Data traffic dispatcher 315 receives the traffic from buffers 310a through 310m and distributes it to those sub-modules that are available for operation. The dispatcher 315 may either detect the status of each sub-module or be notified by the controller 340. When the data traffic has been processed by the function module 320, it passes to aggregator 325 where it is aggregated to accommodate the available number of FIFO buffers 330a through 330m. The buffers 330a through 330m evaluate the traffic load and pass load statistics to the controller 340. The data traffic is then serialized for transmission to the next stage by serializers 335a through 335m.

Note that in this embodiment, status control may also be applied to deserializers 305a through 305m and serializers 335a through 335m. Note also that the controller is associated with a physical, non-transitory memory device (not shown) for storing the traffic load statistics and operating instructions for execution by the controller. The memory device and controller are in this embodiment resident on each circuit board, along with the function modules controlled. In alternate embodiments, however, these components may reside elsewhere in the access node.

Figure 7:
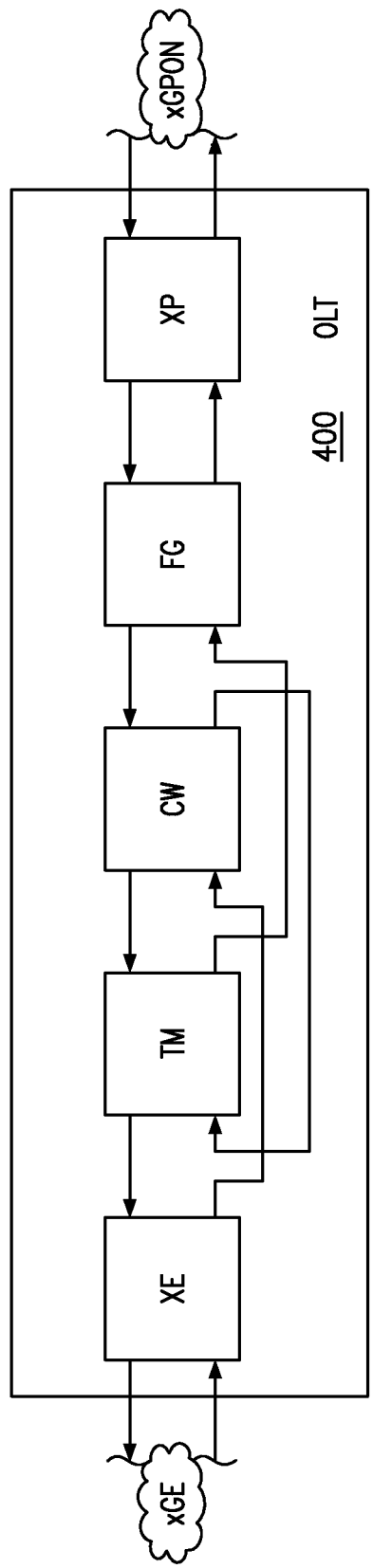
FIG. 7 is a simplified schematic diagram illustrating selected components of OLT according to an embodiment of the present invention.

An exemplary access node according to an embodiment of the present invention is illustrated in FIGS. 7 and 8a through 8c. FIG. 7 is a simplified schematic diagram illustrating selected components of OLT 400 according to an embodiment of the present invention. In accordance with the present invention, each of a number of access node functions is performed by a function module that is divided into a number of separately controllable sub-modules (not shown in FIG. 7). Each of these one or more function modules is formed on a circuit board, and in this embodiment five separate boards are used. The access node handles traffic in both the upstream and downstream direction between a xGPON and a xGE (gigabit Ethernet) network.

The five boards of this embodiment are referred to as XP, FG, CW, TM, and XE. Traffic flows in both the upstream and downstream directions are indicated by the traffic flow arrows in FIG. 7. Traffic is carried from one of these boards to the next using a number of serial links, which can be powered down individually to save power if the existing traffic load is lighter than the total capacity of the access node. Note that the access node 400 may include other components that are not illustrated in FIG. 7, and the number of separate boards may vary from one implementation to the next. Each of these boards will now be described in more detail.

Figure 8A:
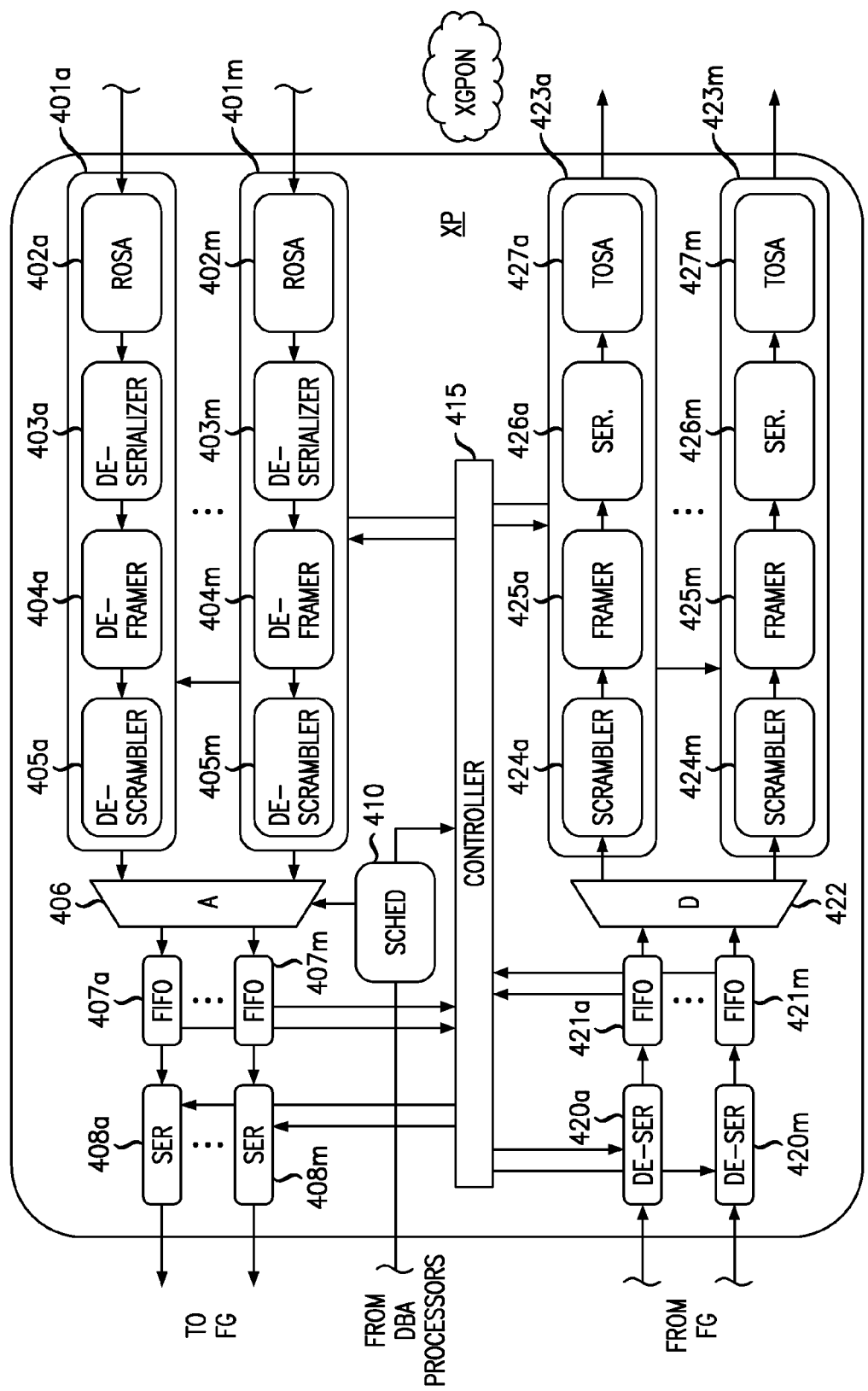
FIGS. 8a through 8e are simplified schematics diagram illustrating in greater detail selected components of the OLT of FIG. 7 according to an embodiment of the present invention.

FIGS. 8a through 8e are simplified schematics diagram illustrating in greater detail selected components of the OLT 400 of FIG. 7 according to an embodiment of the present invention. Many of the functions and organization of the components have been discussed above. FIG. 8a shows selected components of the XP board referred to in FIG. 7 according to this embodiment. Generally speaking, board XP performs PMD and PMA functions. Upstream input from the xGPON is received at PON interface 401, which is divided into sub-modules 401a through 401m. In this embodiment, sub-module 401a includes a ROSA 402a, a de-serializer 403a, a deframer 404a and a de-scrambler 405a. The remaining sub-modules are likewise configured, and their status is individually controllable by controller 415.

In this embodiment, the upstream traffic is then aggregated by data traffic aggregator 406 and buffered in FIFo buffers 407a through 407m, which report load statistics to controller 415, before serializing by serializer sub-modules 408a through 408m. The upstream data traffic is then transmitted to the FG board (see FIG. 8b). Note that upstream scheduler 410 provides schedule input to both aggregator 406 and power and gating controller 415. Note that upstream scheduler 410 receives input from the DBA processors and provides scheduling information to controller 415.

In the embodiment of FIG. 8a, downstream data traffic received from the FG board is handled as well. Received traffic is de-serialized by de-serializer sub-modules 420a through 420m, which are individually controllable by controller 415. De-serialized traffic is places in buffers 421a through 421m before being received in traffic dispatcher 422. Traffic dispatcher 422 distributes the data traffic to PON interface sub-modules 423a through 423m for transmission to an xGPON of the communications network. In this embodiment, sub-module 423a includes a scrambler 424a, a framer 425a, a serializer 426a and a TOSA 427a. The remaining sub-modules are likewise configured, and their status is controllable by controller 415.

Figure 8B:
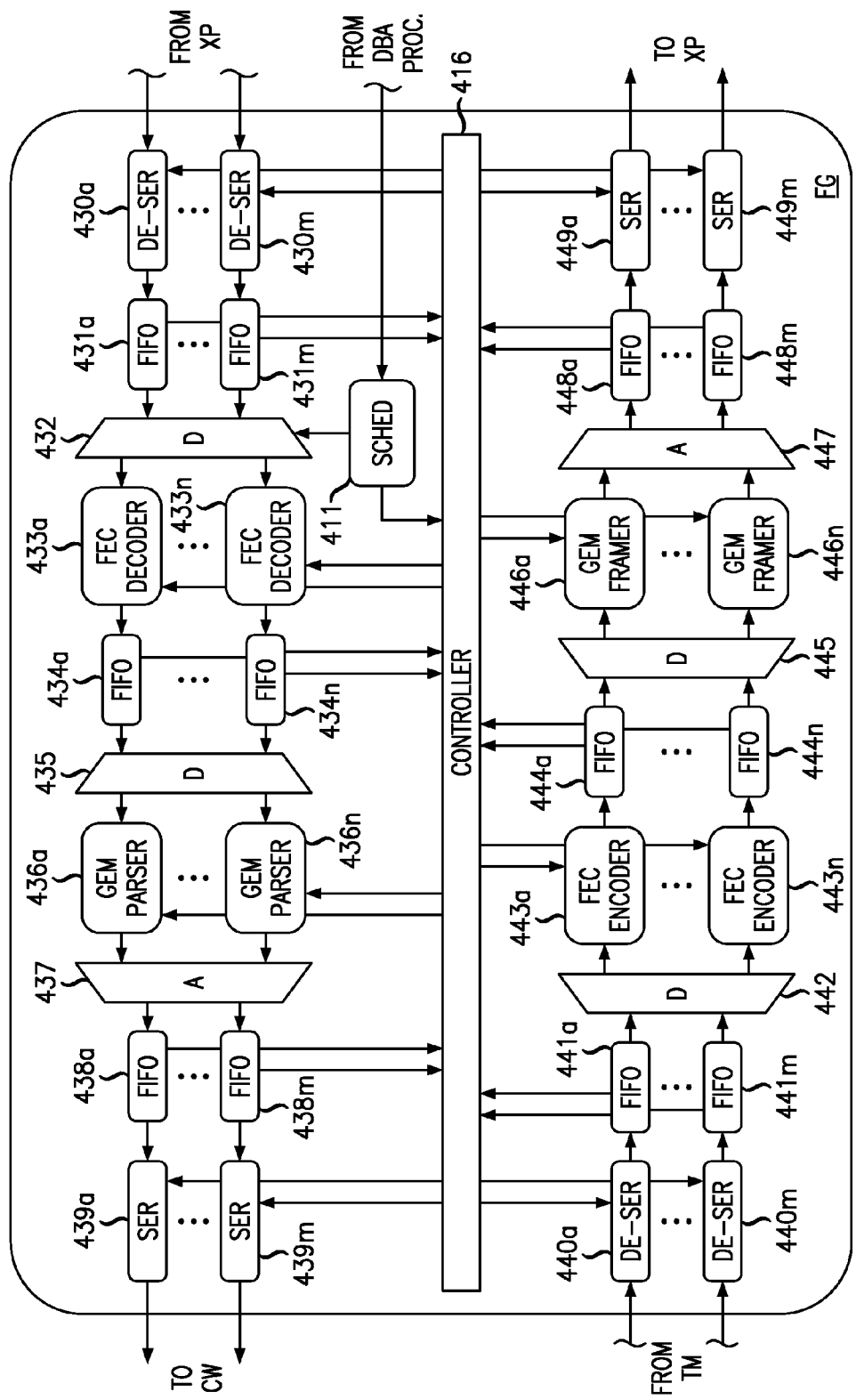

FIG. 8b shows selected components of the FG board referred to in FIG. 7 according to this embodiment of the present invention. Generally speaking, in this embodiment the FG board handles the FEM and GEM functions. Upstream data traffic is received at de-serializer sub-modules 430a through 430m and is stored in buffers 431a through 431m before being received at dispatcher 432. Dispatcher 432 distributes the data traffic to available FEC decoder sub-modules 433a through 433n, after which it is placed in buffers 434a through 434n before being received in dispatcher 435. Dispatcher 435, in turn, distributes the received data traffic to available GEM parser sub-modules 436a through 436n. Aggregator 437 then aggregates the data traffic and passes it to FIFO buffers 438a through 438m. From the buffers, available serializer sub-modules 439a through 439m serialize the traffic for transmission to the CW board.

In this embodiment, controller 416 may be formed as a separate device on board FG, or may be part of a central controller collecting load stats and providing control for sub-modules on multiple boards. The same is true for upstream scheduler 411, shown as a separate component in FIG. 8b.

In the embodiment of FIG. 8b, downstream data traffic received from the TM board is handled as well. Received traffic is de-serialized by de-serializer sub-modules 440a through 440m, whose status is individually controllable by controller 416. De-serialized traffic is places in buffers 441a through 441m before being received in traffic dispatcher 442.

Traffic dispatcher 442 distributes the data traffic to FEC encoder sub-modules 443a through 443n. From there, the down stream traffic is places in buffers 444a through 444n before being received in traffic dispatcher 445. Traffic dispatcher 445 distributes the data traffic to available GEM framer sub-modules 446a through 446n. After processing by the GEM framer function module, the data traffic is aggregated in aggregator 447 and places in buffers 448a through 448m before being serialized by serializers 449a through 449m for transmission to the XP board.

As shown in FIG. 8b, the controller 416 receives load statistics collected by the buffers on board FG, and controls the status of individual function modules (as well as the serializers and de-serializers).

Figure 8C:
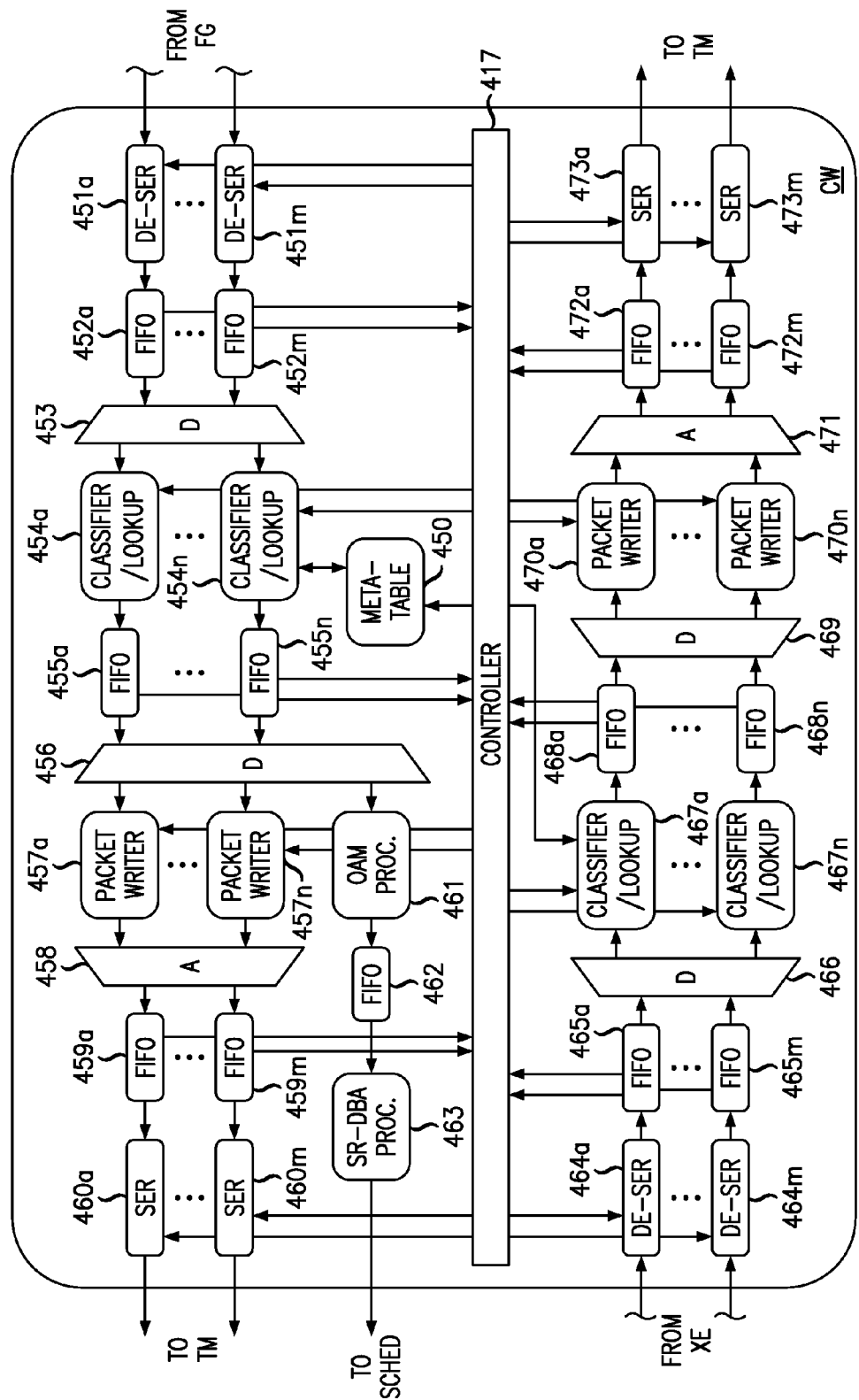

FIG. 8c shows selected components of the CW board referred to in FIG. 7 according to this embodiment. The classifier and packet writer function modules reside on board CW. Upstream data traffic is received at de-serializer sub-modules 451a through 451m and is stored in buffers 452a through 452m before being received at dispatcher 453. Dispatcher 453 distributes the data traffic to available classifier/lookup sub-modules 454a through 454n, after which it is placed in buffers 455a through 455n before being received in dispatcher 456. Meta-table 450 is available to sub-modules 454a through 454n for use in classifier/lookup processing.

In this embodiment, dispatcher 456 distributes the data traffic to available packet writer sub-modules 457a through 457n. Dispatcher 456 also provides OAM packets to an OAM processor 461, which after processing, are places in a FIFO buffer 462 and are then processed by an SR-DBA processor, which then sends information to the upstream scheduling module or modules for use in providing scheduling input. Other methods of collecting upstream scheduling information may also be used. This centralized upstream scheduling (see also FIGS. 8a and 8b), permits data packets to be dropped earlier rather than stored too long in memory only to be dropped later when they cannot be transmitted because of trunk line congestion.

In the embodiment of FIG. 8c, after processing the data traffic by packet writer sub-modules 457a through 457n, the traffic is aggregated in aggregator 458 and placed in buffers 459a through 459m before being passed to serializers 460a through 460m before being transmitted to board TM.

In the embodiment of FIG. 8c, downstream data traffic received from the XE board is handled as well. Received traffic is de-serialized by de-serializer sub-modules 464a through 464m, which are individually controllable by controller 417. De-serialized traffic is places in buffers 465a through 465m before being received in traffic dispatcher 466. Dispatcher 466 distributes the data traffic to available classifier/lookup sub-modules 467a through 467n, after which it is placed in buffers 468a through 468n before being received in dispatcher 469. Meta-table 450 is available to sub-modules 467a through 467n for use in classifier/lookup processing.

In this embodiment, dispatcher 469 distributes the data traffic to available packet writer sub-modules 470a through 470n. After processing the data traffic by packet writer sub-modules 470a through 470n, the traffic is aggregated in aggregator 471 and placed in buffers 472a through 472m before being passed to serializers 473a through 473m before being transmitted to board TM.

As shown in FIG. 8c, the controller 417 receives load statistics collected by the buffers on board CW, and controls the status of individual function modules (as well as the serializers and de-serializers).

Figure 8D:
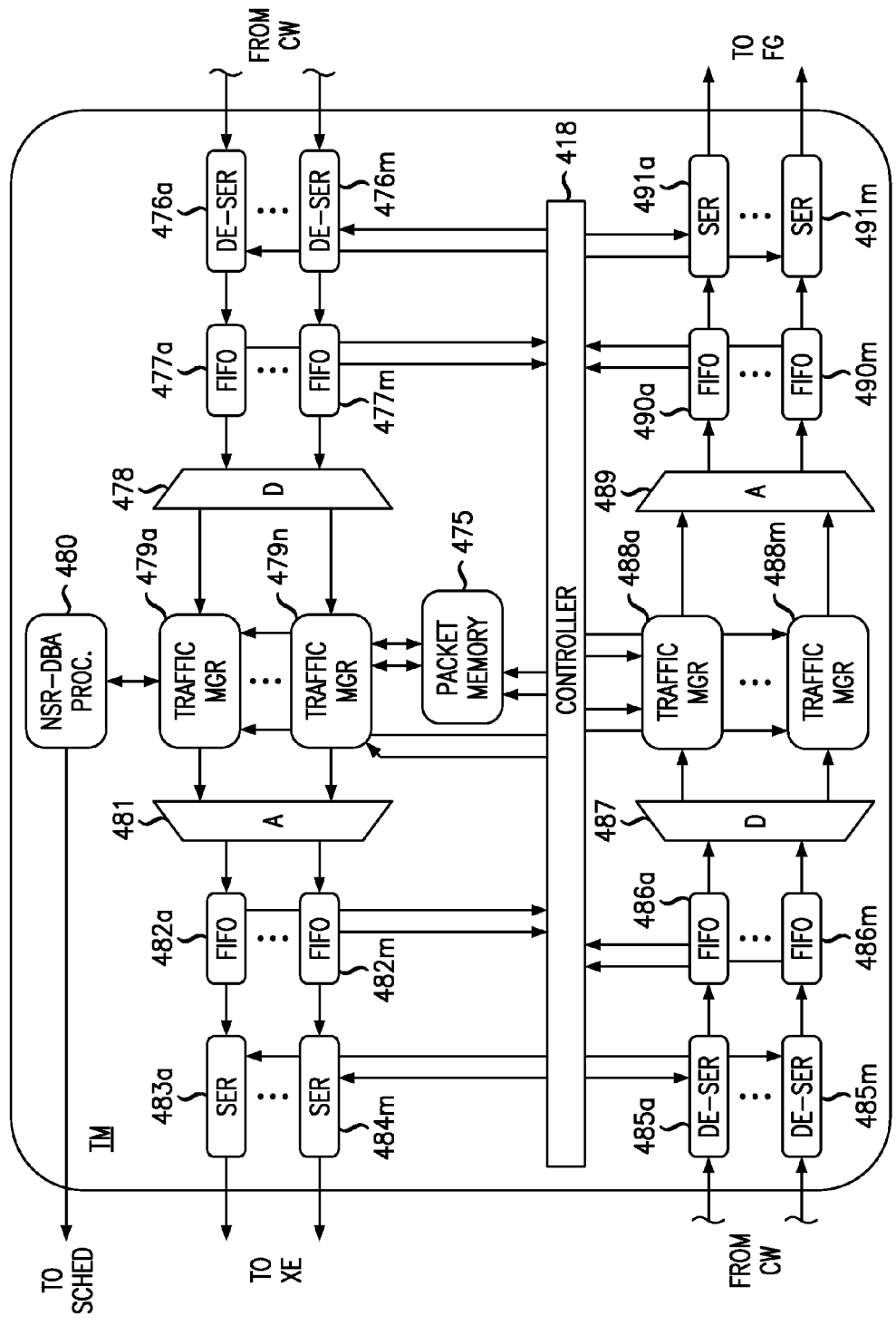

FIG. 8d shows selected components of the TM board referred to in FIG. 7 according to this embodiment. The traffic manager function module resides on board TM. Upstream data traffic is received at de-serializer sub-modules 476a through 476m and is stored in buffers 477a through 477m before being received at dispatcher 478. Dispatcher 478 distributes the data traffic to available traffic manager sub-modules 479a through 479n, after which it is aggregated by traffic aggregator 481 and placed in buffers 482a through 452m before being passed to serializers 483a through 483m before being transmitted to board XE.

In this embodiment, an NSR-DBA module collects information from the traffic manager function module 479, and provides updates to the scheduling modules of the OLT 400. Also shown separately in FIG. 8d is a packet memory device for use by the traffic manager function modules 479 and 488.

In the embodiment of FIG. 8d, downstream data traffic received from the CW board is handled as well. Received traffic is de-serialized by de-serializer sub-modules 485a through 485m, which are individually controllable by controller 418. De-serialized traffic is places in buffers 486a through 486m before being received in traffic dispatcher 487. Dispatcher 487 distributes the data traffic to available traffic manager sub-modules 488a through 488n, after which it is aggregated by traffic aggregator 489 and placed in buffers 490a through 490m before being passed to serializers 491a through 491m before being transmitted to board FG.

As shown in FIG. 8d, the controller 418 receives load statistics collected by the buffers on board TM, and controls the status of individual function modules (as well as the serializers and de-serializers).

Figure 8E:
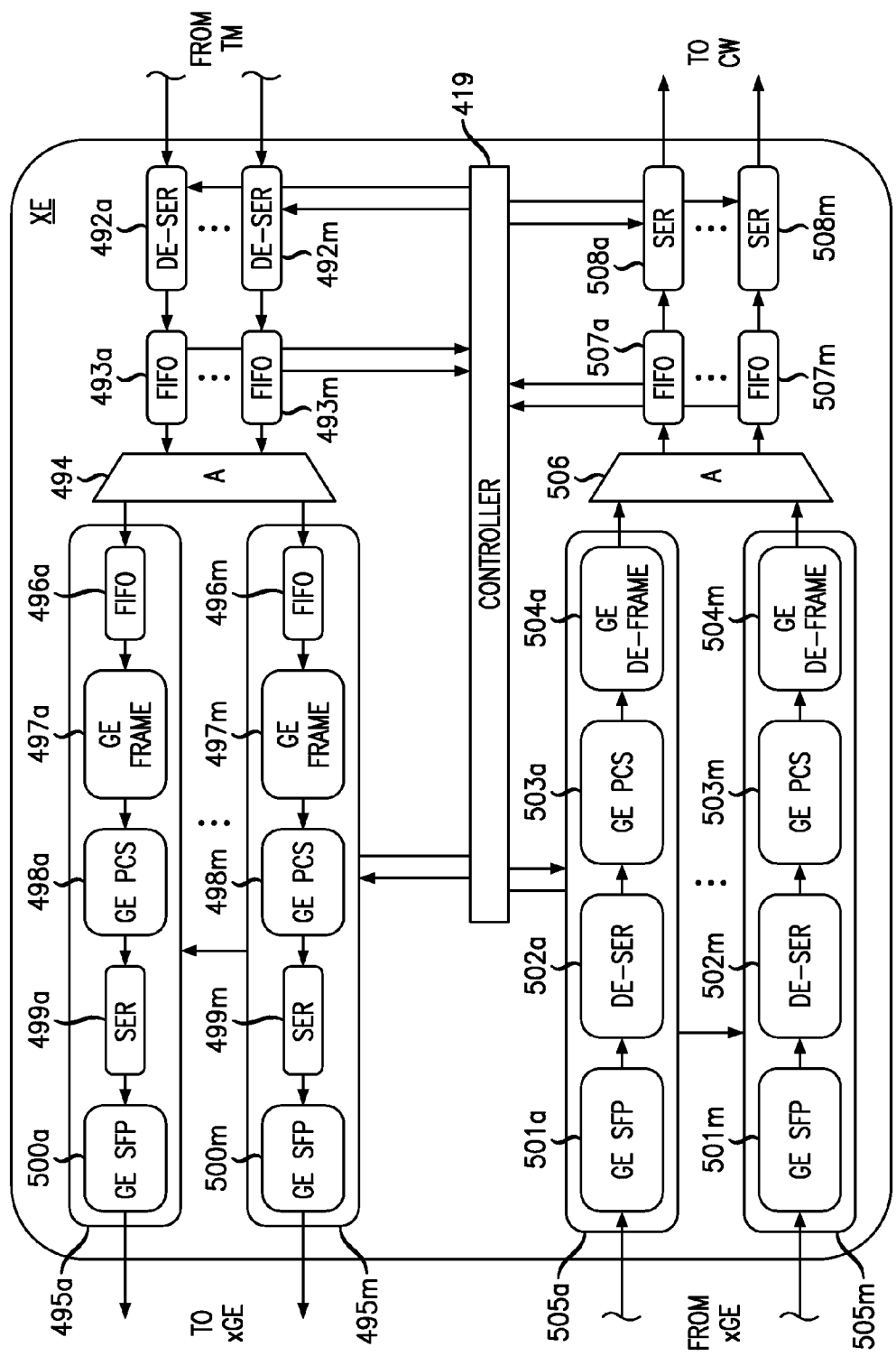

FIG. 8e shows selected components of the XE board referred to in FIG. 7 according to this embodiment. Generally speaking, board XE is the xGE board that interfaces with the core side of the communications network. Upstream data traffic from board TM is received at de-serializer sub-modules 492a through 492m and is stored in buffers 493a through 493m before being received at dispatcher 494. Dispatcher 494 distributes the data traffic to available GE interface sub-modules 495a through 495m. Sub-module 495a includes a FIFO buffer 496a, a GE framer 497, a GE PCS 498, a serializer 499a and a GE SFP 500a. The remaining GE interface 495 sub-modules are configured in like fashion.

In the embodiment of FIG. 8e, downstream data traffic received from the GE network is handled as well. Received traffic is processed by GE interface sub-modules 505a through 505m. Sub-module 505a includes a GE SFP 501a, a deserializer 502a, a GE PCS 503a, and a GE de-framer 504a. The remaining GE interface 505 sub-modules are configured in like fashion. After processing by GE interface sub-modules 505a through 505m, the data traffic is aggregated by traffic aggregator 506 and placed in buffers 507a through 507m before being passed to serializers 508a through 508, after which it is transmitted to board CW.

As shown in FIG. 8e, the controller 419 receives load statistics collected by the buffers on board TM, and controls the status of individual function modules (as well as the serializers and de-serializers).

FIGS. 7 and 8a through 8c present one embodiment of the present invention. In other embodiments, components may be added or, in some cases, removes without departing from the spirit of the invention. For example, function modules may be grouped on a different circuit board configuration. Where a different access node requires other function modules, it is understood that they may be added to or substituted for those described above.

Figure 9:
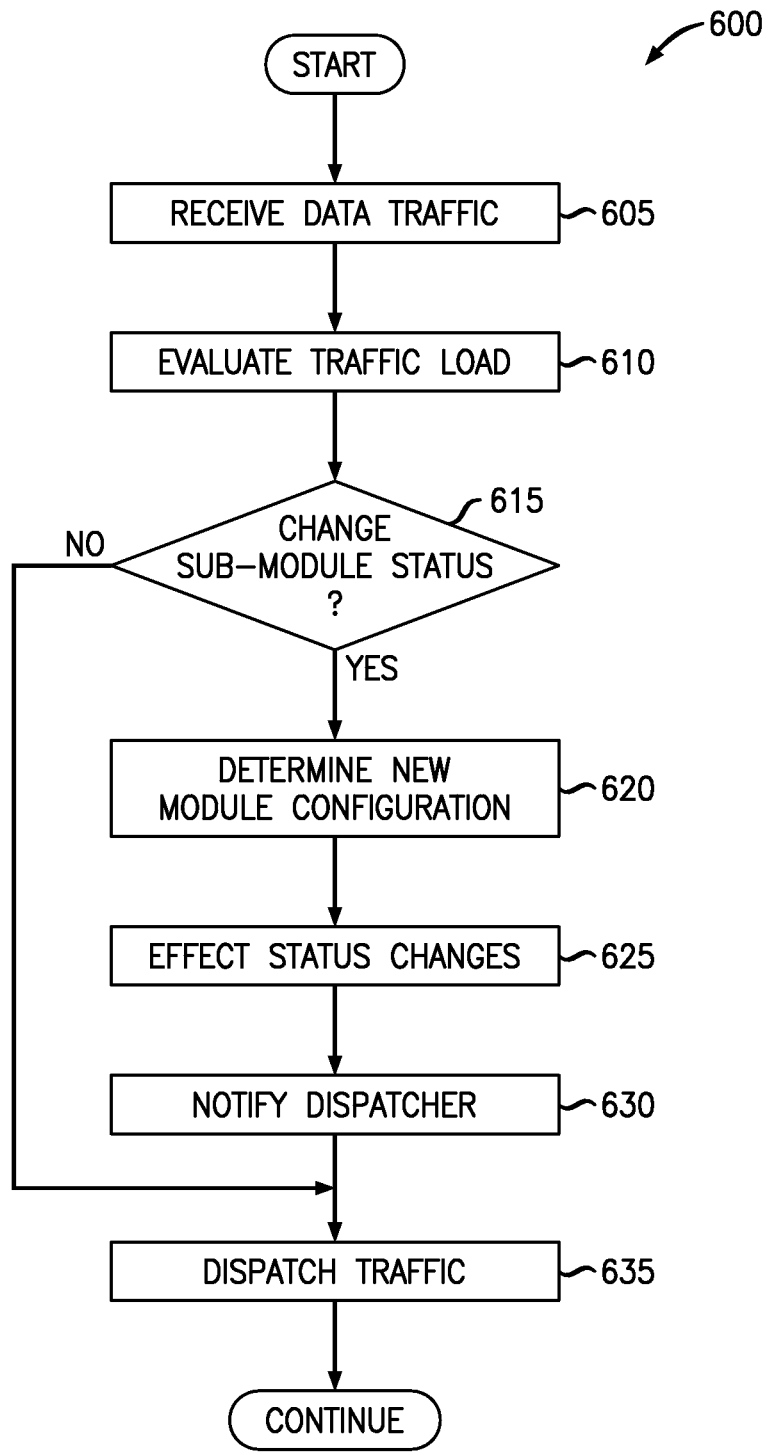
FIG. 9 is a flow diagram illustrating a method according to an embodiment of the present invention.

FIG. 9 is a flow diagram illustrating a method 600 according to an embodiment of the present invention. At START, it is assumed that the components necessary to performing method 600 are available and configured according to this embodiment. The process then begins with receiving data traffic (step 605) at a function module in an access node. The traffic load is then evaluated (step 610), and a determination (step 615) is made as to whether the status of the sub-modules should be changed. Note that a pre-determined status schedule or other information may be considered in making the determination of step 615. If not, the traffic is distributed to available sub-modules in the function module (step 635). If, on the other hand, a determination is made at step 615 that a change is required, then the new module configuration is determined (step 620) and the changes in status are effected (step 625).

As mentioned above, in accordance with the present invention, status changes may include making one or more sub-modules of the function module operational, applying clock-gating, or powering down. In the embodiment of FIG. 9, the dispatcher associated with the function module is then notified (step 630) of the new status configuration, so that the traffic may be properly dispatched to available sub-modules (step 635).

Figure 10:
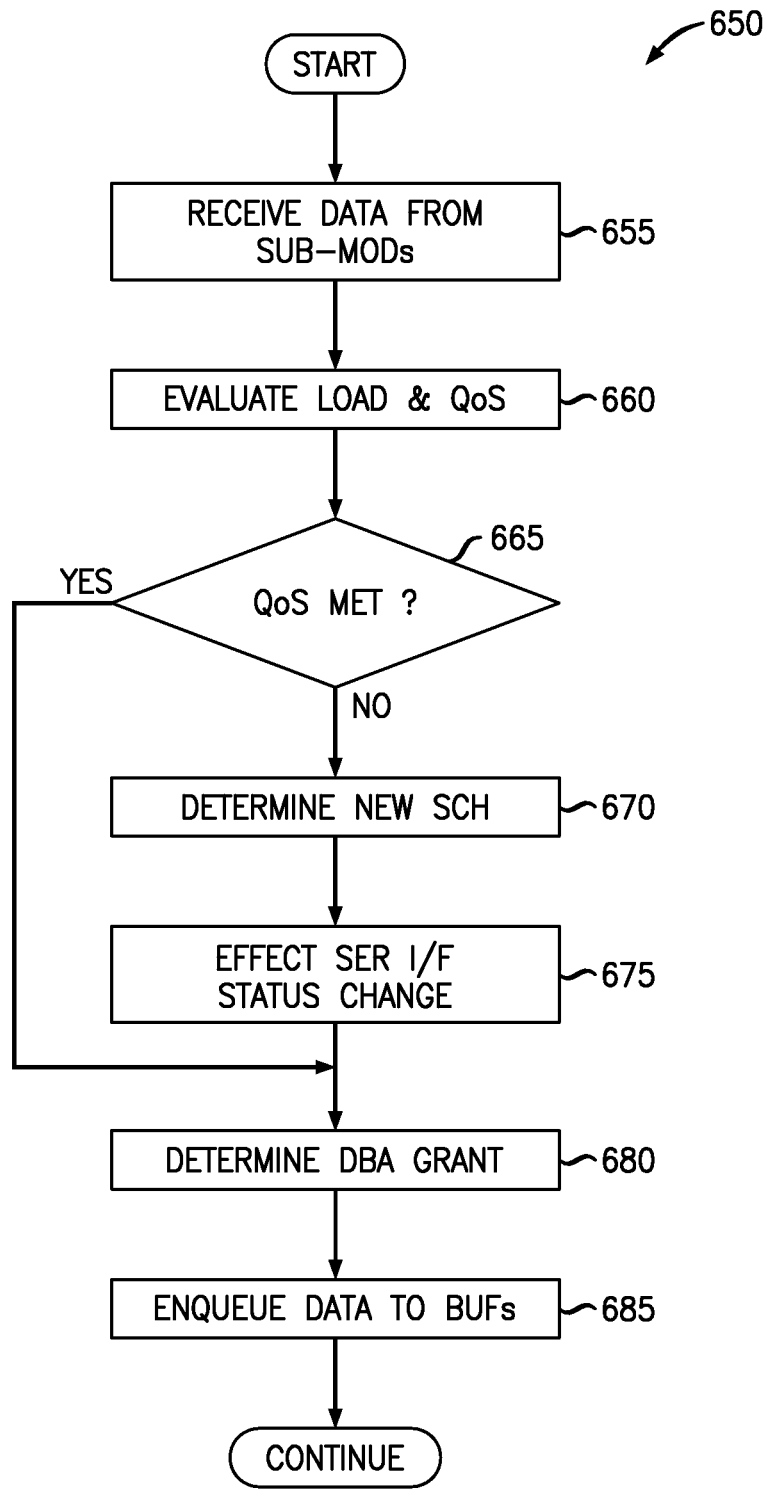
FIG. 10 is a flow diagram illustrating a method according to another embodiment of the present invention.

FIG. 10 is a flow diagram illustrating a method 650 according to another embodiment of the present invention. At START, it is assumed that the components necessary to performing method 650 are available and configured according to this embodiment. The process then begins with receiving data traffic (step 655) in a traffic aggregator from the sub-modules of a function module. When the aggregator receives the data traffic, the traffic load and QOS are evaluated (step 660).

In the embodiment of FIG. 10, a determination is then made as to whether the applicable QoS is met (step 665). If so, the DBA grant is determined (step 680). Based on the information acquired, the data traffic is enqueued in buffers (step 685) associated with the available serial links or other channel to the next stage or component.

In this embodiment, if it is determined at step 665 that the QOS is not met, then a new schedule is determined (step 670). Based on the new schedule, the necessary changes in serial interface status are effected (step 675). Once any necessary changes are made, the DBA grant may be determined (step 680) and the data traffic placed in buffers associated with the available serial link interfaces (step 685).

Note that the sequence of operation illustrated in FIGS. 9 and 10 represent exemplary embodiments; some variation is possible within the spirit of the invention. For example, additional operations may be added to those shown in FIGS. 9 and 10, and in some implementations one or more of the illustrated operations may be omitted. In addition, the operations of the methods may be performed in any logically-consistent order unless a definite sequence is recited in a particular embodiment.

In this fashion the present invention provides an efficient access node and method of operation that may be deployed in communications networks such as xGPON or DSL networks.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An access node for a PON communications network, the access node for performing a plurality of functions related to handling PON traffic between two portions of the communications network, the access node comprising:

a plurality of PON traffic-handling function modules arranged in series, each function module configured for executing a function of the plurality of functions, wherein at least one function module is divided into a plurality of sub-modules each capable of performing the function of the at least one function module;

at least one traffic dispatcher, wherein the at least one traffic dispatcher is positioned between the first interface and the at least one function module, wherein the traffic dispatcher is configured to dispatch the traffic to one or more of the plurality of sub-modules for processing; and a controller configured for controlling the status of sub-modules in the plurality of sub-modules.

2. The access node of claim 1, wherein the controller is further configured to power down and power up an individual sub-module.

3. The access node of claim 1, wherein the controller is further configured to apply clock-gating to an individual sub-module.

4. The access node of claim 1, wherein the controller is further configured for receiving load statistics representative of the amount of PON traffic being handled by the access node.

5. The access node of claim 4, wherein the controller is further configured for controlling the status of sub-modules based at least in part on the received load statistics.

6. The access node of claim 1, further comprising a traffic aggregator configured for aggregating the traffic after processing by the one or more of the plurality of sub-modules.

7. The access node of claim 6, wherein the traffic aggregator is further configured for distributing the aggregated traffic to a plurality of transmission links.

8. The access node of claim 7, wherein the controller is further configured for controlling the status of at least one transmission link of the plurality of transmission links.

9. The access node of claim 1, wherein at least two function modules of the plurality of function modules are formed on separate circuit boards.

10. The access node of claim 1, wherein the access node is an OLT.

11. The access node of claim 1, wherein the access node is a DSLAM.

12. A method of operating a PON access node having a plurality of function modules arranged in series, at least one function module of the plurality of function modules being divided into a plurality of sub-modules, the method comprising:

receiving PON traffic at the access node; and processing the PON traffic though the plurality of serial function modules, wherein processing the PON traffic comprises:

distributing the PON traffic into one or more of the plurality of sub-modules of the at least one function module for processing by the function module; and aggregating the PON traffic after processing by the function module.

13. The method of claim 12, further comprising determining whether to change the status of one or more of the plurality of sub-modules.

14. The method of claim 13, further comprising changing the status of one or more sub-modules.

15. The method of claim 14, wherein changing the status of one or more sub-modules comprises powering down a sub-module.

16. The method of claim 14, wherein changing the status of one or more sub-modules comprises applying clock gating to a sub-module.

17. The method of claim 14, wherein changing the status of one or more sub-modules comprises returning a sub-module to operation.

18. The method of claim 13, further comprising generating load statistics indicative of the amount of traffic being handled by the access node.

19. The method of claim 18, wherein the determination of whether to change the status of one or more of the plurality of sub-modules is based at least in part on the load statistics.

20. The method of claim 13, wherein aggregating the PON traffic further comprises aggregating the PON traffic into a transmission channel comprising a plurality of transmission links.

21. The method of claim 20, further comprising controlling the status of at least one of the plurality of transmission links.

22. An access node for a communications network, the access node for performing a plurality of functions related to handling data traffic between two portions of the communications network, the access node comprising:
- a first interface configured for receiving traffic from the first portion of the network;
- a plurality of function modules, each function module configured for executing a function of the plurality of functions wherein at least one function module is divided into a plurality of sub-modules each capable of performing the function of the at least one function module;
- at least one traffic dispatcher, wherein the at least one traffic dispatcher is positioned between the first interface and the at least one function module, wherein the traffic dispatcher is configured to dispatch the traffic to one or more of the plurality of sub-modules for processing;
- a traffic aggregator configured for aggregating the traffic after processing by the plurality of sub-modules and for distributing the aggregated traffic to a plurality of transmission links;
- a controller configured for controlling the status of sub-modules in the plurality of sub-modules and for controlling the status of at least one transmission link of the plurality of transmission links; and
- a second interface configured for forwarding traffic to the second portion of the network.

* * * * *